(12) United States Patent
Wessman et al.

(10) Patent No.: US 9,275,484 B2
(45) Date of Patent: Mar. 1, 2016

(54) GOODNESS OF FIT BASED ON ERROR CALCULATION AND FIT TYPE

(71) Applicant: Hewlett-Packard Development Company, L. P., Houston, TX (US)

(72) Inventors: Timothy James Wessman, Fort Collins, CO (US); Gregory Thorn Springer, Santa Fe, NM (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 13/873,474

(22) Filed: Apr. 30, 2013

(65) Prior Publication Data

US 2014/0320501 A1  Oct. 30, 2014

(51) Int. Cl.
G06T 11/20 (2006.01)
G06F 17/18 (2006.01)

(52) U.S. Cl.
CPC .............. *G06T 11/206* (2013.01); *G06F 17/18* (2013.01)

(58) Field of Classification Search
None
See application file for complete search history.

(56) References Cited

U.S. PATENT DOCUMENTS

2010/0286534 A1* 11/2010 Greenberg .................... 600/484

OTHER PUBLICATIONS

Curve Fitting Toolbox for Use with MATLAB N.p.: The MathWorks, 2004. PDF.*
Curve Fitting Toolbox for Use with MATLAB N.p.: The MathWorks, Mar. 2012. PDF.*
Curve Fitting for the HP 35s Programmable Calculator, (Web Page), 15 pps., http://www.stefanv.com/calculators/hp35s_curve_fitting.html.
Curve Fitting Toolbox, (Research Paper), For Use with MATLAB(R), User's Guide Version 1, The MathWorks, Jul. 2001, 216 pps., http://www.phys.huji.ac.ll/Phys_Hug/MAABADA/Mabada_b/curve fitting in Matlab.pdf.

* cited by examiner

*Primary Examiner* — Mark Zimmerman
*Assistant Examiner* — Vu Nguyen
(74) *Attorney, Agent, or Firm* — Hewlett-Packard Legal Dept.

(57) ABSTRACT

Examples disclose selecting an error calculation corresponding to a measure of goodness of fit and identifying a fit type among multiple fit types based on the selected error calculation. The identified fit type indicates a better fit type of goodness of fit than the multiple fit types. The examples further disclose providing the goodness of fit based on the selected error calculation and the identified fit type.

20 Claims, 5 Drawing Sheets

GOODNESS OF FIT BASED ON ERROR CALCULATION AND FIT TYPE

BACKGROUND

Electronic devices may perform statistical modeling including calculating, providing, and/or displaying various statistical models. The various statistical models may represent how actual data values are related to expected data values.

BRIEF DESCRIPTION OF THE DRAWINGS

In the accompanying drawings, like numerals refer to like components or blocks. The following detailed description references the drawings, wherein.

DETAILED DESCRIPTION

Statistical modeling may be performed on a device to calculate and provide the various statistic models. The statistical modeling may be provided in a static manner that makes it difficult to understand how the statistical model may change based on different selected criteria. For example, a user may select a type of fit and may then provide the user command to the computing device to calculate the statistical model based on the fit type. To view another type of fit the user may input a different selected type of fit and provide the user command to obtain the different statistical model. This makes it difficult for the user to observe the differences between the statistical models based on a slight change of criteria. Additionally this is not user friendly as there is no direct interaction for the user to learn how varying selections of criteria may change the statistical model. Additionally, providing the feedback based on the user's selections are inefficient as the varying criteria provides a different statistical model in a delayed manner as it may take the user additional step to generate the model.

To address these issues, examples disclosed herein provide a method to select a fit type for modeling a representation of a given set of data values. The method additionally provides a first goodness of fit based on the selected fit type and on a selected first error calculation. The method further provides a second goodness of fit based on the selected fit type and a selected second error calculation. The first goodness of fit and the second goodness of fit are presented in a dynamic manner once the error calculations are selected. These fits provide an illustrative difference to the user which provides better feedback through direct interaction. The method provides better feedback and interaction as the user may directly interact with the criteria used in statistical modeling. This further enables the user to learn how the various statistical models may change with the varying criteria. The selectable criteria may include the fit type, error calculation, and/or manipulation of a data value. This provides immediate feedback in real-time of the statistical model. In this manner, the differences in the various statistical models are provided in a dynamic manner based on the selection of various criteria.

In another example, the method disclosed herein further includes selecting either the first error calculation or the second error calculation and then selecting another fit type among the multiple fit types. Selecting a specific fit type among multiple fit types based on either the first error calculation and/or second error calculation provides additional criteria for selection and observation of the statistical modeling. This also enables the user to identify the best goodness of fit to most accurately predict an expected value based on actual data values.

Examples disclosed herein provides an overall better user experience in presenting differences in statistical models based on a selection of various criteria.

Figure 1:
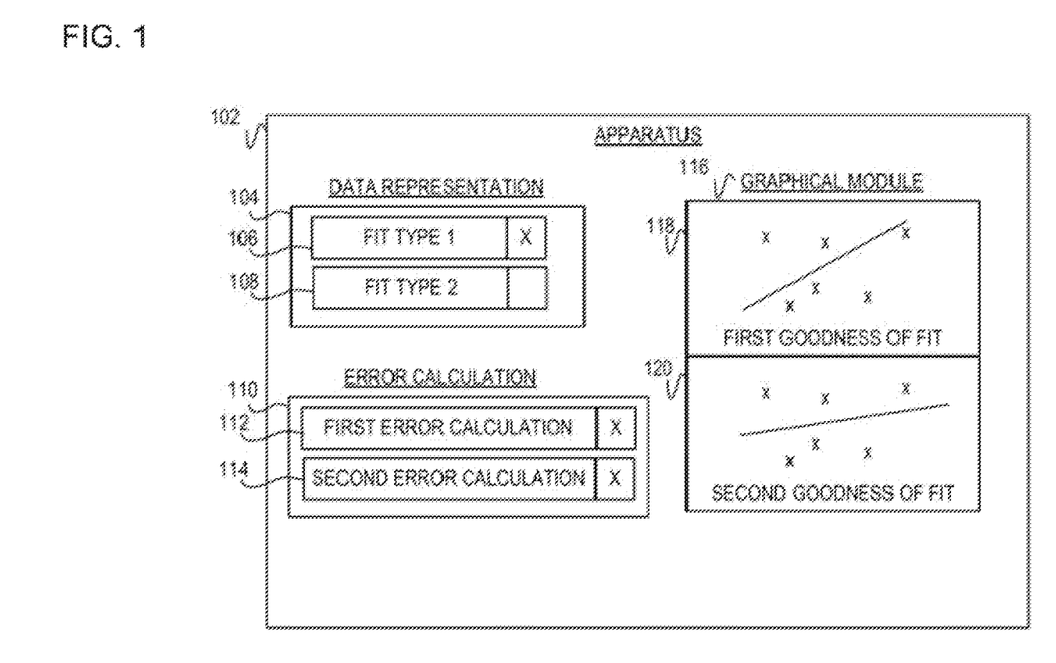
FIG. 1 is a block diagram of an example apparatus including a data representation to select a fit type and a graphic module to provide a first goodness of fit based on the selected fit type and a first error calculation, the graphic module is also to provide a second goodness of fit based on the selected fit type and a second error calculation.

Referring now to the figures, FIG. 1 is a block diagram of an example apparatus 102 including a data representation module 104 to select one of the fit types 106 and/or 108. The apparatus 102 also includes a graphical module 116 to provide a first goodness of fit 118 based on the selected fit type 106 and a first error calculation 112 and a second goodness of fit 120 based on the selected fit type 106 and a second error calculation 114. The first goodness of fit 118 and the second goodness of fit 120, as described herein, are statistical models which represent the measure of fit based on a set of given data values. The apparatus 102 is an electronic device programmed to carry out specific tasks and/or operations. Specifically, the apparatus 102 includes the capabilities to carry out statistical modeling which includes calculating, providing, and/or displaying various statistical models. As such, implementations of the apparatus 102 include a calculator, client device, personal computer, laptop, mobile device, tablet, or other electronic device capable of providing statistical modeling. In another implementation, the apparatus 102 may provide a user interface for a user of the apparatus 102 to navigate among the various selections including: fit types 106 and 108, the error calculations 112 and 114, and data values to manipulate the goodness of fits 118 and 120. In a further implementation, the apparatus 102 provides a learning tool with direct interaction to illustrate how the selected fit type 106 and/or error calculation 112 or 114 may change in the statistical model (e.g., goodness of fit). In this implementation, the goodness of fit may change in a dynamic manner to illustrate changes based on the selected criteria. Implementations of the apparatus 102 should not be limited to those illustrated in FIG. 1, as the apparatus 102 may further include a processor (not illustrated) to graph and calculate the multiple fits 118 and 120.

The data representation module 104 provides a type of interface which one of the fit types 106 or 108 may be selected to generate one of the goodness of fits 118 or 120. The data representation module 104 provides the different types of modeling representations to fit data values. Specifically, the data representation module 104 provides a navigational interface for the user of the apparatus 102 to vary the fit types 106 and 108 through selection. As such, implementations of the data representation module 104 may include a touch screen, key pad, mouse pad, or other type of input for navigating the selection of the fit types 106 and 108. For example, the data representation module 104 may include a linear fit type as "fit type 1," 106 and a polynomial fit type as "fit type 2," 108. In this example, different goodness of fits 118 and 120 corresponding to the fit types may vary when the various fit types 106 and 108 are selected. In following the example, once the linear fit type is selected, a fit similar to first goodness of fit 118 may be observed to fit the data values, while the polynomial fit type may display a more curved line. In this regard, the selection of the fit types 106 and 108 serves as a learning tool in illustrating the differences in the statistical models. Although FIG. 1 illustrates the data representation module 104 as including two fit types 106 and 108, implementations should not be limited as this was done for illustration purposes. For example, there may be three fit types and include the linear fit type, the polynomial fit type, and/or a quadratic fit type.

The different fit types 106 and 108 are modeling representations of the data values. The fit types 106 and 108 include modeling the shape of a line through the data values which may best predict the next expected data value. Additionally, the selected fit type 106, as indicated with the "x," right next to "fit type 1," demonstrates the selection of the fit type 106. Each fit type 106 and 108 represents a different type of modeling representation. As such, implementations of the various fit types 106 and 108 may include linear, cubic, polynomial, quadratic, logarithmic, logistic, trigonometric, or other type of modeling representation to describe the values of data. Implementations should not be limited to selecting one of the fit types 106 and 108 by an "x," as this was done for illustration purposes. For example, the selected fit type 106 may also be selected through highlighting and/or other indicator highlighting the selection of the fit type 106.

The error calculation module 110 is a type of interface which the user of the apparatus 102 may select the different types of error calculations 112 and 114 to perform regression analysis of the data values. One of the error calculations 112 and 114 is selected at a time based on the selected fit type 106 to generate one of the goodness of fits 118 or 120. The error calculation module 110 provides a navigational interface for the user to select one of the error calculations 112 and 114 to obtain the corresponding goodness of fit 118 and 120 based on the selected fit type 106. As such, implementations of the error calculation module 110 may include a touch screen, key pad, mouse pad, or other type of input for navigating the selection of the error calculations 112 and 114. Further, although FIG. 1 illustrates the error calculation module 110 as including two error calculations 112 and 114 for selection, implementations should not be limited as this was done for illustration purposes. For example, there may be a third type of error calculation (not illustrated).

The error calculations 112 and 114 are criteria which each includes a different type of calculation through which the apparatus 102 performs regression analysis to obtain the goodness of fits 118 and 120. Specifically, each of the error calculations 112 and 114 provide a measure of goodness of fit between a given set of data values and predicted data values. The first error calculation 112 corresponds to the first goodness of fit 118, while the second error calculator 114 corresponds to the second goodness of fit 120. The error calculations 112 and 114 provide navigational selections for the corresponding goodness of fit 118 and 120 to change accordingly. In this regard, the selected error calculation 112 and 114 may change the goodness of fit in a dynamic manner, enabling the user of the apparatus 102 to observe the changes of the fits 118 and 120 depending on the selected error calculation 112 and 114. Implementations of the error calculations 112 and 114 include any number of sums based on residuals. For example, the error calculations 112 and 114 may include chi-squared test, sum of squares due to error (SSE), root mean squared error (RMSE), root mean square, sum of squared residuals (SSR), room mean square (RMS), R-square, adjusted R-square, Pearson's correlation coefficient, sum of differences, coefficient of determination, lack-of fit sum squares, or other type of calculation to provide the measure of goodness of the fit. In one implementation, each of the error calculations 112 and 114 provide a numerical error value displayed with each goodness of fit 118 and 120. In this implementation, the best goodness of fit may be identified through the numerical error value. In a further implementation, an equation corresponding to each of the goodness of fits 118 and 120 are displayed. These implementations are explained in detail in the next figure.

The graphical module 116 represents a display which may provide the various fits 118 and 120. The graphical module 116 plots the values of data as indicated with the scattered plot, each data value represented by an "x." In an implementation, the graphical module 116 includes a touch-screen in which the user may manipulate (e.g., change) one of the data values by dragging one "x," to another area of the graphical module 116. Changing the data value, the fits 118 and 120 may change to a third goodness of fit, different from the first and the second goodness of fit 118 and 120. As such, implementations of the graphical module 116 include a display, touch screen, key pad, mouse pad, or other type of display which may provide a type of interface for the manipulation of a data value. In another implementation, the graphical module 116 displays the first and the second goodness of fit 118 and 120 simultaneously. In a further implementation, the graphical module 116 displays the first goodness of fit 118 once the selected fit type 106 and the first error calculation have been selected 112; however, the first goodness of fit 118 may change in a dynamic manner or instantaneously to the second goodness of fit 120 based on the selected fit type 106 once the second error calculation 114 has been selected.

The goodness of fits 118 and 120 are statistical models based on the selected fit type 106 and the corresponding error calculation 112 or 114 to describe or represent how well each goodness of fit 118 and 120 fits a given set of data values. For example, the first goodness of fit 118 may be considered a better goodness of fit over the second goodness of fit 120 as the discrepancy between the actual data values plotted on the graph and predicting the next data value may be minimal. In this regard, the first goodness of fit 120 more accurately predicts the expected data values than the second goodness of fit 118. The data values are plotted on each of the graphs with an "x," represented by a type of scatter graph. The first goodness of fit 118 is based on the selected fit type 106 and the first error calculation 112, while the second goodness of fit 120 is based on the selected fit type 106 and the second error calculation 114. In this implementation, the selected fit type 106 remains unchanged between the first goodness of fit 118 and the second goodness of fit 120, while the error calculations change 112 and 114 illustrate the changes between the fits 118 and 120. For example, the selected fit type among both the first goodness of fit 118 and the second goodness of fit 120 is the linear type of fit as indicated with the linear line; however, each of the fits 118 and 120 illustrate differences between the use of the error calculations 112 and 114, thus enabling a determination of the better goodness of fit 118 or 120 through visual representation and/or numerical value. In another implementation, one of the error calculations 112 and 114 is selected and may remain unchanged, while the fit types 106 and 108 may change, representing further differences between the fits 118 and 120.

Figure 2:
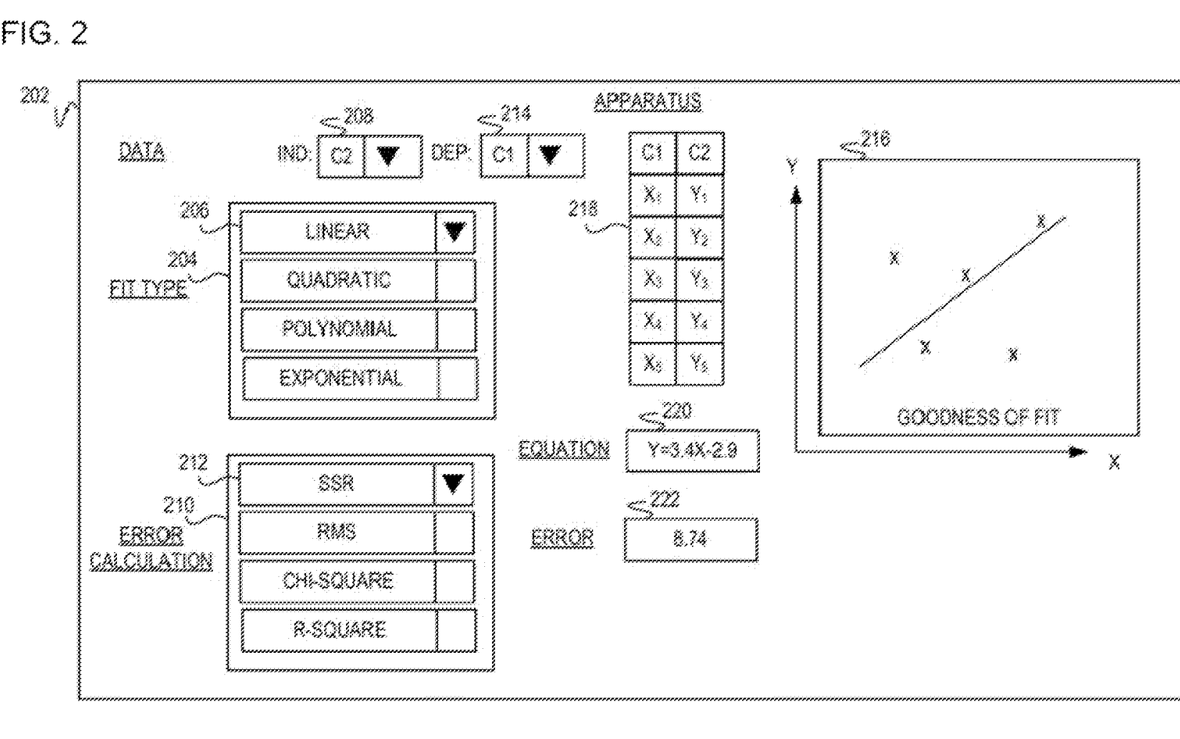
FIG. 2 is a block diagram of example interface associated with an apparatus, the interface includes selecting data, multiple fit types, and multiple error calculations to illustrate a goodness of fit.

FIG. 2 is a block diagram of an example interface associated with an apparatus 102. The interface enables direct interaction to select various criteria to illustrate how the criteria may change a goodness of fit 216. The selection of the various criteria includes a fit type 204 among multiple fit types 204 and an error calculation 212 among multiple error calculations 210. The interface further includes a selection of independent data values 208 and dependent data values 214 as part of a data value set 218. Additionally, the interface provides an equation 220 and a numerical error value 222 based on the selected fit type 206 and the selected error calculation 212 to illustrate a goodness of fit 216. Further, although FIG. 1 illustrates the selection of criteria including the fit type 206, the error calculation 212, independent data values 208, and the dependent data values 214 through a selection symbol, implementations should not be limited to this illustration. For example, the selection of criteria may include highlighting the selected criteria. The apparatus 202 may be similar in structure and functionality to the apparatus 102 as in FIG. 1.

The multiple fit types 204 are the various selections of fit type criteria that may be selected through the interface. The fit types 204 include the representations of how to model the data values 218. The selected fit type 206 is a specific type of modeling representation as selected through the user interface. As illustrated in FIG. 2, the fit types 204 of the goodness of fit graph 216 may include linear, quadratic, polynomial, and exponential. The linear fit type 206 is selected as indicated with the symbol and illustrated in the goodness of fit graph 216. In another example, once the polynomial fit type is selected, the goodness of fit graph 216 may change instantaneously (i.e., without further input) to illustrate the differences between the fit types 204. In this example, the selected error calculation 212 remains unchanged while the fit types 204 may change so the best goodness of fit (e.g., the fit type with least error) is determined. The selected fit type 206 may be similar in functionality to the selected fit type 106 as in FIG. 1.

The multiple error calculations 210 are the various selection of error criteria used to generate the goodness of fit graph 216. The selected error calculation 212 is the type of calculation used to measure the goodness of fit 216 based on the data values 218 and the selected fit type 206. The selected error calculation 212 may also be used to determine the numerical error value 222. The numerical data value 222 determines an actual value of deviation between the actual data values 218 and a future data value. This data value 222 may correspond to measuring the goodness of fit 216, thus enabling an identification of the best fit.

The data set 218 includes the data values for plotting on the graph 216. The data values 218 are the given actual values used to predict future data values. The independent data values 208 may be selected among columns of the data set 218. The independent data values 208 correspond to the x-axis of the goodness of fit graph 216. The dependent data values 214, selected among the columns of the data set 218, correspond to the values on the y-axis of the goodness of the fit graph 216.

The goodness of fit graph 216 is a statistical model based on the criteria selections of the selected fit type 206 and the selected error calculation 212. The goodness of fit graph 216 represents how well it fits the set of given data values 218. The goodness of fit graph 216 may be similar in structure and functionality to the first goodness of fit 118 and the second goodness of fit 120 as in FIG. 1.

The equation 220 is an expression of the shape of the goodness of fit 216 used to predict an expected data value. In this implementation, the variables X and Y are variables used to predict the next data value.

The numerical error value 222 represents a deviation of using the selected error calculation 212 from a given data value. The numerical value 222 may be used to determine the best goodness of fit for a set of data values based on the selection of the fit type 206 and the error calculation 222. In one embodiment, the lower numerical value, the lower the deviation indicating a better goodness of fit.

Figure 3:
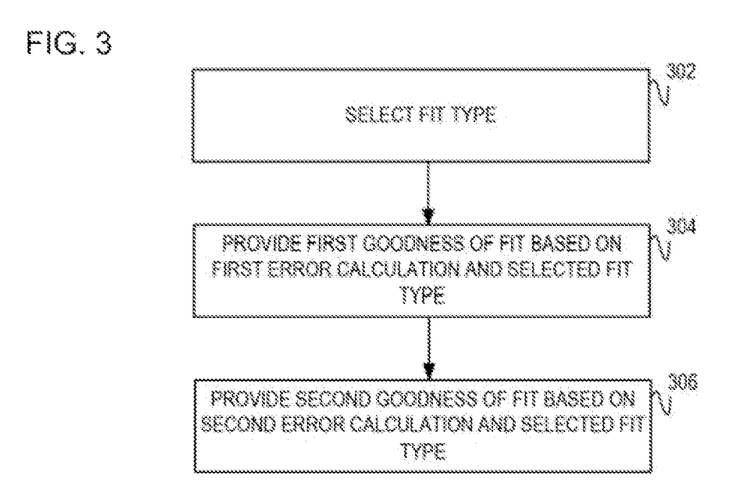
FIG. 3 is a flowchart of an example method to select a fit type, provide a first goodness of fit based on a first error calculation and the selected fit type, and provide a second goodness of fit based on a second error calculation and the selected fit type.

FIG. 3 is a flowchart of an example method to select a fit type, provide a first goodness of fit based on a first error calculation and the selected fit type, and provide a second goodness of fit based on a second error calculation and the selected fit type. In discussing FIG. 3, references may be made to the components in FIGS. 1-2 to provide contextual examples. Further, although FIG. 3 is described as implemented by apparatus 102 as in FIGS. 1-2, it may be executed on other suitable components. For example, FIG. 3 may be implemented in the form of executable instructions on a machine readable storage medium, such as machine-readable storage medium 504 as in FIG. 5.

At operation 302, the fit type is selected. The fit type is a modeling representation of data values to each other. The modeling representation estimates a relationship among variables the data values. Selecting various fit types to represent the data values may be used for regression analysis to best predict the next data value. In the manner, the best goodness of fit (i.e., the best data value predictor) is obtained. Selecting various fit types illustrates how a goodness of fit may change when one of the data values are manipulated (i.e., changed) while the other data values remain unchanged. The fit type may be selected on an interface such as in FIG. 2 or may be selected by the apparatus 102 as in FIGS. 1-2. In one implementation, operation 302 may include obtaining the data values and/or plotting the data values on the graph.

At operation 304, the apparatus provides the first goodness of fit based on the first error calculation and the selected fit type as at operation 302. The first error calculation is the type of error calculation used in regression analysis of the data values to obtain and measure the first goodness of fit. Examples of the error calculation may include chi-squared, Pearson's coefficient, coefficient of determination, sum of squares due to error, root mean squared error, etc. The goodness of fit extrapolates data values to estimate, beyond the given data values (i.e., actual variable of data), the expected data values. The goodness of fit describes how well the selected fit type as at operation 302 fits the data values. The goodness of fit measures the discrepancies between given data values and predicting data values using the selected fit type as at operation 302. In this manner, the better the goodness of fit, the more accurately the predicted value of data lines up with the goodness of fit. In one implementation, a user may select the first error calculation among various error calculations through a user interface to provide the first goodness of fit. In another implementation, the apparatus selects the first error calculation, without user input, to provide the first goodness of fit. In a further implementation, the apparatus plots the first goodness of fit on a graph with the data values.

At operation 306, the apparatus provides the second goodness of fit based on the second error calculation and the selected fit type as at operation 302. The second goodness of fit at operation 306 illustrates a different goodness of fit than the first goodness of fit as at operation 304. In this manner, the user of the apparatus may select various fit types and/or various error calculations to observe the manner in which the goodness of fit changes. Enabling the user to select the various fit types and/or various error calculations provides an element of direct interactivity for the user to view and learn how the goodness of fit changes with the various selections. In one implementation of operation 306, the apparatus plots the first goodness of fit as at operation 304 and then plots the second goodness of fit to illustrate the differences between both of the goodness of fits. In a further implementation of operation 306, the variables of data may be plotted on a graph simultaneously with both the first goodness of fit as at operation 304 and the second goodness of fit. The first goodness of fit and the second goodness of fit as provided at operations 304 and 306 each represent a different goodness of fit. Illustrating the differences is highlighted through the use of the first error calculation and the second error calculation. Both of the error calculations are used to analyze the values of data to measure the various (e.g., the first and the second) goodness of fits. In yet a further implementation, the second error calculation at operation 306 is a different type of error calculation than the first error calculation as at operation 304. For example, the first error calculation to measure the first goodness of fit may include sum of squares due to error (SSE), while the second error calculation to measure the second goodness of fit may include the root mean squared error (RMSE).

Figure 4:
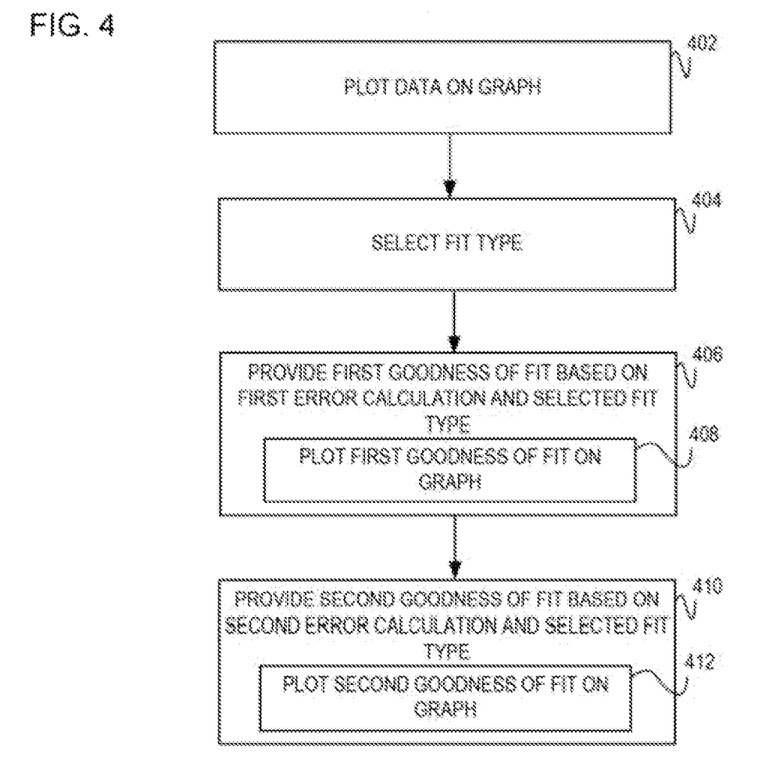
FIG. 4 is a flowchart of an example method to plot data on a graph, select a fit type, plot a first goodness of fit based on a first error calculation and the selected fit type, and plot a second goodness of fit based on a second error calculation and the selected fit type.

FIG. 4 is a flowchart of an example method to plot data values on a graph, select a fit type, plot a first goodness of fit based on a first error calculation and the selected fit type, and plot a second goodness of fit based on a second error calculation and the selected fit type. In discussing FIG. 4, references may be made to the components in FIGS. 1-2 to provide contextual examples. Further, although FIG. 4 is described as implemented by apparatus 102 as in FIGS. 1-2, it may be executed on other suitable components. For example, FIG. 4 may be implemented in the form of executable instructions on a machine readable storage medium, such as machine-readable storage medium 504 as in FIG. 5.

At operation 402, the apparatus plots the data values on a graph. The data includes independent data values and dependent values. In one implementation of operation 402, the independent data values are plotted on either the X-axis or Y-axis while the dependent data values are plotted on the other axis. For example, the independent data values may correspond to the Y-axis while the dependent data values correspond to the X-axis. In one implementation of operation 402, a user may manipulate or change the value of one of the data values plotted on the graph to obtain a goodness of fit corresponding to the manipulated data. In this implementation, the user may have direct interaction with manipulated data values to observe the goodness of fit to determine which goodness of fit may best predict the next data value. In another implementation, the user may manipulate the values of data by interacting with the plotted graph and using a touch screen, change one of the data values. In a further implementation, the user may directly change the data value by inputting a different value. In these implementations, the values of data may be manipulated a third goodness of fit of which is different from the both the first goodness of fit and the second goodness of fit provided at operations 406-412.

At operation 404, the apparatus selects the fit type. In another implementation of operation 404, the apparatus includes a user interface for the user to select the fit type. Examples of the fit type include linear, polynomial, exponential, etc. Operation 404 may be similar in functionality to operation 302 as in accordance with FIG. 3.

At operation 406, the first goodness of fit is provided based on a first error calculation and the selected fit type as at operation 404. The error calculations measure how successful a fit is in explaining variations in the data values. At operation 408, the apparatus plots the first goodness of fit on the graph. The graph may include the data values as at operation 402.

At operations 410-412, the second goodness of fit is provided based on a second error calculation and the selected fit type as at operation 404. The apparatus plots the second goodness of fit on the graph which may include the data values obtained at operation 402. The second goodness of fit is a statistical model, different from the first goodness of fit at operations 406-408, which describes or represents how well the data values at operation 402 fit based on the selected fit type at operation 404 using the second error calculation selected at operation 410. The second goodness of fit illustrates a difference between the first goodness of fit at operation 406-408 based on the selected error calculation. In one implementation the first goodness of fit provided at operation 406 is displayed simultaneously with the second goodness of fit obtained at operation 410. In another implementation, the first goodness of fit changes to the second goodness of fit based on the selection of the second error calculation. For example, the user may select data to plot on a graph and select a linear fit type at operations 402-404. At operations 404-406, the user may then select the type of first error calculation, such as sum of squares of the regression which the calculator plots and displays the first goodness of fit using the sum of squares of the regression and based on the linear type of fit. The calculator may also display the error value with the fit. At operations 410-412, the user may then select the second error calculation, the calculator may change the first goodness of fit to the second goodness of fit so the user may observe the difference with selecting and using the first error calculation and the second error calculation. In this regard, the user may obtain the best fit for a set of data based on the selecting the fit type and selecting the error calculations.

Figure 5:
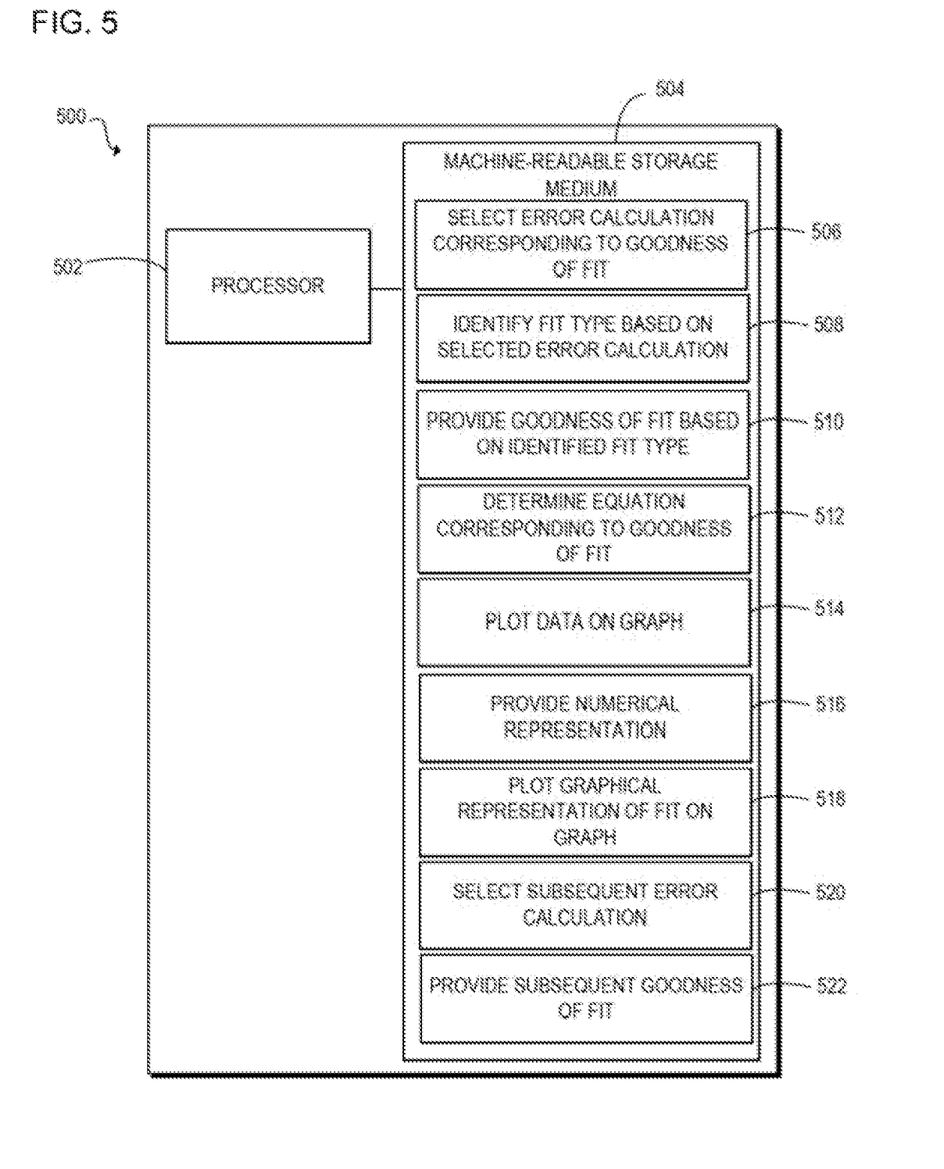
FIG. 5 is a block diagram of an example computing device with a processor to execute instructions in a machine-readable storage medium for selecting an error calculation corresponding to a goodness of fit, identifying a fit type among multiple fit types based on the selected error calculation, and providing the goodness of fit based on the selected error calculation and the identified fit type.

FIG. 5 is a block diagram of computing device 500 with a processor 502 to execute instructions 506-522 within a machine-readable storage medium 504. Specifically, the computing device 500 with the processor 502 is to select an error calculation and identify a fit type for a better goodness of fit among multiple fit types. Although the computing device 500 includes processor 502 and machine-readable storage medium 504, it may also include other components that would be suitable to one skilled in the art. For example, the computing device 500 may include a controller to execute instructions 506-522. The computing device 500 is an electronic device with the processor 502 capable of executing instructions 506-522, and as such embodiments of the computing device 500 include a computing device, mobile device, client device, personal computer, desktop computer, laptop, tablet, video game console, or other type of electronic device capable of executing instructions 506-522. The instructions 506-522 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory.

The processor 502 may fetch, decode, and execute instructions 506-522 for selecting an error calculation corresponding to a goodness of fit, identifying a fit type among multiple fit types based on the selected error calculation, and providing the goodness of fit based on the selected error calculation and the identified fit type. In one implementation, once executing instructions 506-510, the processor 502 may execute instructions 510-518. In another implementation, once executing instructions 506-510 and/or instructions 512-518, the processor 502 may execute instructions 520-522 to provide a subsequent goodness of fit based on a subsequent error calculation. Specifically, the processor 502 execute instructions 506-510 to: select an error calculation corresponding to a goodness of fit, identify a fit type based on the selected error calculation, and provide a goodness of fit based on the identified fit type and the selected error calculation. The processor 502 may then execute instructions 512-518 to: determine an equation corresponding to the goodness of fit as at instructions 510, plot data values on a graph, provide a numerical representation of the goodness of fit at instructions 510, and plot the goodness of fit on the graph with the data values. Once executing instructions 506-510, the processor 502 may execute other instructions 520-522 to: select a subsequent error calculation and provide the subsequent goodness of fit based on the selected subsequent error calculation and identified fit type.

The machine-readable storage medium 504 includes instructions 506-522 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), and Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

Examples disclosed herein provides an overall better user experience in presenting differences in statistical models based on a selection of various criteria.

We claim:

1. An apparatus comprising:
   a display device;
   a data representation module to select a fit type among multiple fit types, wherein the selected fit type is a modeling representation of data; and
   a graphical module to:
   present an interface screen on the display device, wherein the interface screen simultaneously includes a first fit type control, a second fit type control, a first error calculation type control, a second error calculation type control, a first graph area, and a second graph area;
   receive, using the interface screen, selection inputs to select the first fit type, the first error calculation type, and the second error calculation type;
   in response to the selection inputs, simultaneously:
   provide, in the first graph area, a first graph to illustrate a first goodness of fit based on the selected first fit type and the selected first error calculation; and
   provide, in the second graph area, a second graph to illustrate a second goodness of fit based on the selected first fit type and the selected second error calculation, wherein the first graph and the second graph together illustrate a difference between the first goodness of fit and the second goodness of fit.

2. The apparatus of claim 1 further comprising:
   an equation module to provide on the interface screen, simultaneously with providing the first graph and the second graph:
   a first equation representing the first goodness of fit; and
   provide a second equation representing the second goodness of fit.

3. The apparatus of claim 1 further comprising:
   an error module to provide on the interface screen, simultaneously with providing the first graph and the second graph:
   provide a first numerical representation corresponding to a measure of the first goodness of fit; and
   provide a second numerical representation corresponding to a measure of the second goodness of fit.

4. The apparatus of claim 1 wherein the apparatus is a calculator.

5. The apparatus of claim 1, wherein the first and second fit types are selected from a group comprising linear, exponential, quadratic, cubic, logarithmic, trigonometric, and polynomial.

6. The apparatus of claim 1, wherein the first and second error calculations are selected from a group comprising chi-squared test, sum of squares due to error (SSE), root mean squared error (RMSE), root mean square, sum of squared residuals (SSR), room mean square (RMS), R-square, adjusted R-square, Pearson's correlation coefficient, sum of differences, coefficient of determination, and lack-of-fit sum squares.

7. A non-transitory machine-readable storage medium encoded with instructions executable by a processor of a computing device, the instructions executable to:
   present an interface screen on a display of the computing device, wherein the interface screen simultaneously includes a first fit type control, a second fit type control, a first error calculation type control, a second error calculation type control, a first graph area, and a second graph area;
   receive, using the interface screen, selection inputs to select the first fit type, the first error calculation type, and the second error calculation type;
   in response to the selection inputs, simultaneously:
   provide, in the first graph area, a first graph to illustrate a first goodness of fit based on the selected first fit type and the selected first error calculation; and
   provide, in the second graph area, a second graph to illustrate a second goodness of fit based on the selected first fit type and the selected second error calculation, wherein the first graph and the second graph together illustrate a difference between the first goodness of fit and the second goodness of fit.

8. The non-transitory machine-readable storage medium of claim 7 further comprising instructions to provide on the interface screen, along with the first graph and the second graph:
   a first numerical representation corresponding to a measure of the first goodness of fit; and
   a second numerical representation corresponding to a measure of the second goodness of fit.

9. The non-transitory machine-readable storage medium of claim 7 further comprising instructions to provide on the interface screen, along with the first graph and the second graph:
   a first equation corresponding to the first goodness of fit; and a second equation corresponding to the second goodness of fit.

10. The non-transitory machine-readable storage medium of claim 7, wherein the computing device is a hand-held calculator.

11. The non-transitory machine-readable storage medium of claim 7, wherein the first and second fit types are selected from a group comprising linear, exponential, quadratic, cubic, logarithmic, trigonometric, and polynomial.

12. The non-transitory machine-readable storage medium of claim 7, wherein the first and second error calculations are selected from a group comprising chi-squared test, sum of squares due to error (SSE), root mean squared error (RMSE), root mean square, sum of squared residuals (SSR), room mean square (RMS), R-square, adjusted R-square, Pearson's correlation coefficient, sum of differences, coefficient of determination, and lack-of-fit sum squares.

13. A method, executable by a computing device, the method comprising:
presenting an interface screen on a display device of the computing device, wherein the interface screen simultaneously includes a first fit type control, a second fit type control, a first error calculation type control, a second error calculation type control, a first graph area, and a second graph area;
receiving, on the interface screen, selection inputs to select the first fit type, the first error calculation type, and the second error calculation type;
in response to the selection inputs, simultaneously:
providing, in the first graph area, a first graph representing a first goodness of fit based on a first error calculation and the first fit type; and
providing, in the second graph area, a second graph representing a second goodness of fit based on a second error calculation and the first fit type, the first graph and the second graph to provide an illustrative difference between the first goodness of fit and the second goodness of fit.

14. The method of claim 13 further comprising:
manipulating the data to obtain a third goodness of fit.

15. The method of claim 13 wherein the first fit type includes one of the following: linear, exponential, quadratic, cubic, logarithmic, trigonometric, and polynomial.

16. The method of claim 13 wherein the computing device is a calculator.

17. The method of claim 13 wherein the first and second error calculations are selected from a group comprising chi-squared test, sum of squares due to error (SSE), root mean squared error (RMSE), root mean square, sum of squared residuals (SSR), room mean square (RMS), R-square, adjusted R-square, Pearson's correlation coefficient, sum of differences, coefficient of determination, and lack-of-fit sum squares.

18. The method of claim 13, further comprising, simultaneously with providing the first graph and the second graph:
providing, on the interface screen, a first equation representing the first goodness of fit; and
providing, on the interface screen, a second equation representing the second goodness of fit.

19. The method of claim 13, further comprising, simultaneously with providing the first graph and the second graph:
providing, on the interface screen, a first numerical representation corresponding to a measure of the first goodness of fit; and
providing, on the interface screen, a second numerical representation corresponding to a measure of the second goodness of fit.

20. The method of claim 13, further comprising, simultaneously with providing the first graph and the second graph:
providing a data value set on the interface screen.

* * * * *